(12) United States Patent
Martin, Jr. et al.

(10) Patent No.: US 12,175,395 B2
(45) Date of Patent: *Dec. 24, 2024

(54) SYSTEMS AND METHODS FOR ENHANCING AND FACILITATING ACCESS TO SPECIALIZED DATA

(71) Applicant: CROSS COMMERCE MEDIA, INC., New York, NY (US)

(72) Inventors: Russell W. Martin, Jr., New York, NY (US); Stephen Messer, New York, NY (US); Heidi Messer, New York, NY (US); Paolo Cappellari, New York, NY (US); Paul Ashaolu, New York, NY (US); Antonio Maccioni, New York, NY (US)

(73) Assignee: Cross Commerce Media, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,143

(22) Filed: Oct. 3, 2023

(65) Prior Publication Data
US 2024/0028979 A1    Jan. 25, 2024

Related U.S. Application Data

(63) Continuation of application No. 16/831,712, filed on Mar. 26, 2020, now Pat. No. 11,775,889.

(51) Int. Cl.
| | | |
|---|---|---|
| *G06Q 10/00* | (2023.01) | |
| *G06F 16/2457* | (2019.01) | |
| *G06F 16/2458* | (2019.01) | |
| *G06Q 10/06* | (2023.01) | |
| *G06Q 10/107* | (2023.01) | |

(Continued)

(52) U.S. Cl.
CPC ....... *G06Q 10/06* (2013.01); *G06F 16/24578* (2019.01); *G06F 16/2462* (2019.01); *G06Q 10/107* (2013.01); *G06Q 10/109* (2013.01); *G06Q 50/01* (2013.01)

(58) Field of Classification Search
CPC ... G06Q 10/06; G06Q 50/01; G06F 16/24578
See application file for complete search history.

(56) References Cited

U.S. PATENT DOCUMENTS

| | | | | |
|---|---|---|---|---|
| 5,930,764 A | * | 7/1999 | Melchione | G06Q 30/02 705/7.29 |
| 10,489,462 B1 | * | 11/2019 | Rogynskyy | H04L 12/14 |

(Continued)

*Primary Examiner* — Gabrielle A McCormick
(74) *Attorney, Agent, or Firm* — Troutman Pepper Hamilton Sanders LLP; James E. Schutz; Christopher C. Close, Jr.

(57) ABSTRACT

A novel approach to facilitating access to valuable actionable content from a multi-tenant database involves system generated ranking of connection content with associated data retrieval methods and systems, utilizing "connector" scores to rank responsive content. The system "learns" how to optimize retrieving and ranking high value actionable content with experience; and applies optimized scoring parameters to enhance future operations. The computer platform is greatly improved by delivering actionable content that is immediately translated into critical operations and tasks recommended by the system to support transactions for the User.

20 Claims, 7 Drawing Sheets

(51) Int. Cl.
*G06Q 10/109* (2023.01)
*G06Q 50/00* (2012.01)

(56) References Cited

U.S. PATENT DOCUMENTS

2018/0225784 A1* 8/2018 Ashokan ................ G06Q 50/16
2019/0096007 A1* 3/2019 Xie ........................ G06Q 50/01

* cited by examiner

SYSTEMS AND METHODS FOR ENHANCING AND FACILITATING ACCESS TO SPECIALIZED DATA

CROSS REFERENCE TO RELATED PATENT APPLICATIONS

This application is a continuation of U.S. patent application Ser. No. 16/831,712, filed 26 Mar. 2020, entitled "Systems and Methods for Enhancing and Facilitating Access to Specialized Data," the entire contents and substance of which is incorporated herein by reference as if fully set forth below. This disclosure incorporates by reference: (i) pending U.S. patent application Ser. No. 15/605,734 titled: Advanced Database Systems and Methods filed May 25, 2017; and (ii) U.S. Pat. No. 9,607,056 titled: Systems and Methods For Providing a Multi-Tenant Knowledge Network, filed on Nov. 10, 2015; as if each was restated in full.

FIELD OF INVENTION

The disclosure is directed to system designs and computer operations that facilitate access to and enhance specialized information parsed from digitally stored large data sets. More particularly, the disclosed technology herein is directed to novel computer and communication systems and methods for improved processing, managing and enhancing of complex data extracted to create refined actionable content for facilitating select communications in support of commercial operations and transactions.

BACKGROUND

A growing interest in managing large data sets has triggered the development and commercial release of multiple computer networks for connecting entities and individuals for purposes of enhancing communications, operations and transactions. To illustrate, Linkedin.com has grown in popularity as a social network for businesspersons, students and professionals. Underlying this network is an enormous database full of detailed information regarding members—both individuals and entities. The data includes connections between individuals and entities as well as personal and professional connections. These relationships in the aggregate reflect the level of association between two or more entities. For any given inquiry or task, a very small amount of meaningful connection data may exist—data otherwise hidden from useful application for users by being buried in the extensive database and thus rendering it nearly impossible to access.

Current solutions to parsing useful connection/relationship data is largely limited to keyword searching. But as will be appreciated, such searching techniques often provide responsive data sets that are of limited usefulness to the identified task or unwieldly in implementing the task. As one example, system managed recalls are not ranked in a manner that allows for enhanced access and implementation by a user.

Problems with existing solutions are particularly acute in the business context including sales, and more specifically in business to business (B2B) sales. In a B2B context, preexisting relationships can be useful to a sales professional/user in helping to make warm introductions, to smooth over problems in the sales process that might be taking place, to help build or establish trust with a prospective buyer, or to help gain information on a decision process or to influence outcomes. But as noted, only limited methods are available to find helpful connections in a user's network. Most existing systems merely extract and identify an existing relationship in an unstructured manner, which is displayed to a user in an unhelpful way. Current systems cannot provide focused content to support the inquiry or prioritize contacts in a way meaningful to the user.

It was with this understanding of the problem that led the inventors to the solutions described below.

SUMMARY

A system can be employed by a user. The system can have access to all of the user's connections in a database. When the user has a business opportunity, the system can analyze the relevant data to determine a set of relationships from the user's connections that can be useful for the business opportunity. Each relationship can then be scored to determine the strength of each relationship. The strength of the relationship can be representative of the ability of the relationship to positively affect the business opportunity or can be representative of the influence a relationship has over a business opportunity, among other things. The relationships can be ranked based on their respective strengths and placed in an ordered list. The ordered list can be outputted and displayed to the user to inform the user on the most useful relationships. The list can continue to be dynamically updated and sorted as the system receives additional information, or the system can use machine learning techniques to tune the scoring system and update the list.

Aspects of the disclosed technology relate to enhanced data extraction processes and provide responsive connections by system-selective ranking of data relationships in a display that is useful to users and provides relevant information in a meaningful, ordered manner. To facilitate the identification and presentation of key relationships/connections between a system user and other system-stored entities, aspects of the disclosed technology can employ either a single or multi-step data extraction process. For a two-step process, disclosed systems can first extract relationship data that conforms with a pre-set threshold used to identify a narrow set of responsive connections. The results of the identified narrow set can then be ranked by application of a connection ranking algorithm or "CRA." Specifically, the second step for ranking of responsive connections can use a machine-tuned algorithm that graphs the responsive and extracted connections ranked by, for example, the recency and frequency of the responsive connection to parameters preselected by the user. The system can then present the top-tier connections as determined by this ranking in a display/UI to the user.

In accordance with various inventive features, the system generates outputs that frame and format the ranked connection responses for display in a manner that facilitates full comprehension of the value associated with each responsive connection to that user. In one embodiment, the disclosed technology supports a B2B sales organization. In this context, the disclosed systems provide an enhanced approach to, and method for, finding and then presenting to users, relationship connections that exist within a user's existing professional and personal environment so that the user can better leverage these relationships to improve sales outcomes and outcomes of various other business transactions. The platform can further supply collaborative tools designed to accurately capture data, apply Robotic Process Automation (RPA) to eliminate low value tasks and augment insights into buyers with AI/ML-driven intelligence. For example, the disclosed technology can analyze the connections around selected transactional activity in the sales pipeline and historical buyer behavior.

As noted above, aspects of the disclosed technology use a select data processing method for ranking such relationships through a scoring system. The ranking algorithm can determine a connection "score" based on, for example, core parameters including the frequency and recency of activities between/among entities and/or parameters of said entities. The calculated score can be expressed in relative or absolute terms, which can be set in advance by a user. As will be appreciated, such parameters and scoring provides a system-determined score that reflects the value of a particular relationship/connection and effectively ranks relationships/connections with other candidates available to solve a particular problem.

Additionally, aspects of the disclosed technology advantageously supplement system-calculated scores with data associated with the role identified individuals play in a selling process. For this method of ranking and differentiating relationships, scoring can factor recency and frequency as well as the role in the transaction to the connected entities. In contrast to currently existing professional and personal networks (e.g., LinkedIn), the system can differentiate responsive connections based on a machine-derived value of such connection/relationship to a user and/or task.

Additional aspects of the disclosed technology support a user (which can be an organization or individual) in connecting data sources (e.g., telephone, email, CRM, billing, procurement, calendar, video conference, etc.) via an API (or similar) so that the user's historical and ongoing data can be mined. The disclosed technology can then create a graph of this data to identify the strength of the relationship, and the generated graph may include recency, frequency and transactional history (selling and buying) found in system data.

In addition to stored data attributes for select entities such recency and frequency, the ranking algorithm also can examine attributes of the user and supplement the scoring of each entity that is examined based on these user attributes.

In accordance with the various implementation alternatives provided by the disclosed technology, systems can further apply scoring data to establish revenue predictions. As system experience grows, system algorithm variables can be dynamically adjusted to better match past actuals in terms of revenue, tightening the correlation between the resulting score and projected revenue. For example, by aggregating the projected revenue over a larger population of users, the system's tolerance and accuracy are improved.

In certain embodiments, the system operates as an overlay to existing sales tools (e.g., CRM, Salesforce.com, etc.), and can convert and normalize data siloed in CRM, email, calendar and other technologies that B2B sales organizations currently use into to a common format for system-compiled analysis. In addition to CRM, email and calendar, according to certain aspects the system database comprises data captured by commercial technology used to support the sales process. Such data can include, for example, conferencing software (e.g., WebEx, GoTo Meeting, etc.), document management tools (e.g., Box, Dropbox, etc.), contract management technology (e.g., Echosign, Docusign) as well as phone logs and other applications used by current sales organizations. As will be appreciated, these expanded heterogenous data sets once normalized offer richer insights by the platform.

System implementations of the disclosed technology enhance sales management's ability to better predict, manage and grow revenue, providing sales professionals with invaluable insights and managers with clarity regarding sales activities and opportunities. The disclosed technology provides the digital backbone to support sales applying a multi-tenant data lake that realigns users with revenue goals and increases productivity by removing low value, time intensive and error ridden tasks from system-defined recommendations and by supplying course-of-action insights that stem from system-identified connections.

FIGURES OF DRAWINGS

DETAILED DESCRIPTION

Briefly in overview, aspects of the disclosed technology constitute an integral component of a data management platform for assisting in transactions. In the sales management context for B2B business, the disclosed technology supports facilitated sales functions by providing a data rich time management platform that provides individual sales representatives insights into closing transactions. Aspects of the disclosed technology can create these insights by deep data processing with machine learning to identify patterns associated with enhanced opportunities. The system operation is enhanced by identifying actionable content from the database store of user relationships. A scoring algorithm ranks high opportunity connections based on select inputs.

Figure 1:
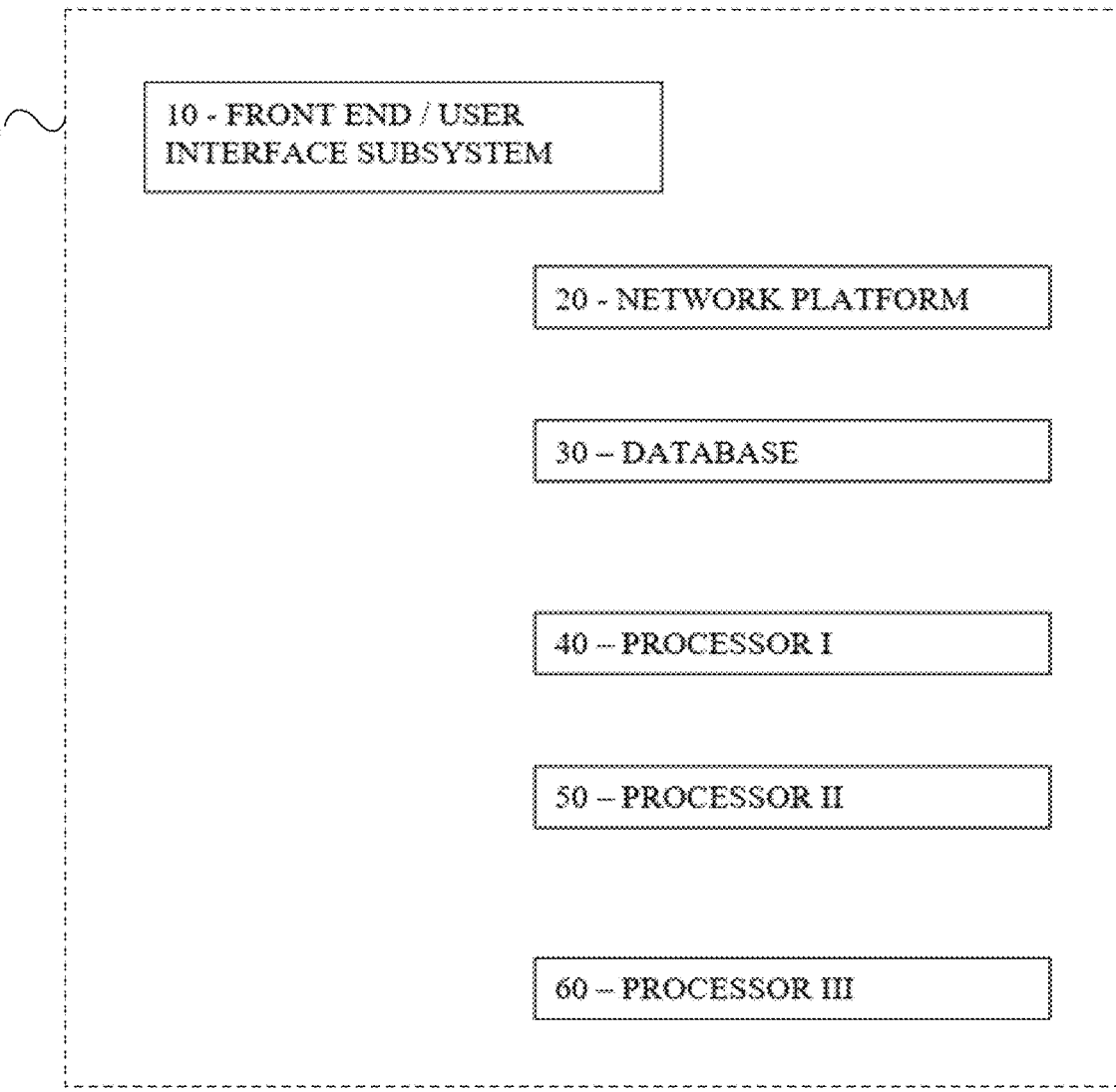
FIG. 1 is a block diagram of an example computer platform forming the hardware environment supporting the disclosed technology.

Turning now to FIG. 1, an example hardware/software platform structure 100 for implementing aspects of the disclosed technology is depicted. As shown, the hardware/platform can employ a distributed processing client/server network with appropriate programming. These different parts are deployed on dislocated hardware devices (aka machines).

Each of these parts can be optimized for any particular implementation. As will be appreciated, this opens to the possibility of installing and using the disclosed technology with limited resources, though a minimum set of hardware requirements are typically required. A typical hardware ecosystem to support the application is composed of the following three hardware subsystems.

Figure 2:
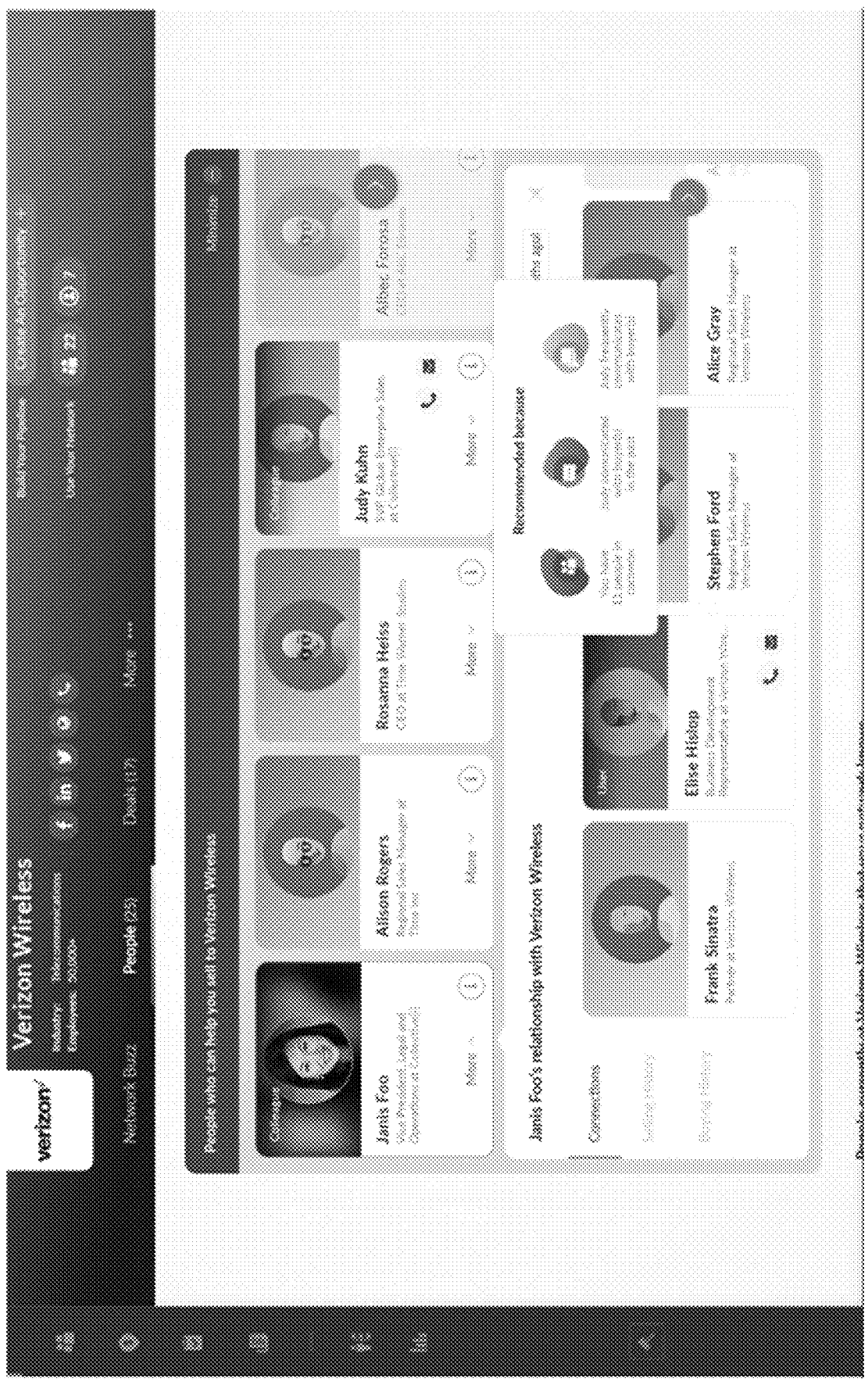
FIG. 2 is an example user interface for requesting a ranked/scored collection of responsive connections.

As further shown in FIG. 1, a front-end machine can provide the user interface into the application. In the context of supporting a sales/management implementation, this user interface can include multiple icon-based screen access points into the salient operations. FIG. 2 is an example user interface as provided on display by the subsystem 10 of FIG. 1, according to certain implementations.

FIG. 1 further shows a second subsystem that is directed to data storage. According to some embodiments, data storage 30 can include one or more databases. For enhanced data access, at least one database can be configured to provide a graph database. The graph database can be augmented by one or more relational databases. As will be understood by one of skill in the art, a graph database applies graph structures to support semantic inquiries, with edges, nodes and properties representing the stored data. Other combinations for select data storage can be implemented as dictated by the system operational specifications.

Processing of stored and retrieved data can be performed on a cluster of computational systems 40, 50 and 60 as reflected in FIG. 1. The processing implements one or more algorithms and includes in some instances advanced machine learning with select training data to update/optimize parameters in rendering connection scores.

In various embodiments, implementing the disclosed technology involves the use of two data sources, which can be characterized as either input data source or output data source. Input data sources are databases that are not created for the sole objective of the application and support other software functions decoupled from the connector processing provided by the disclosed technology. Such input data sources can be considered read-only data from a system perspective. Representative input data sources include one or more of the following:

Transactions, which contains the history of the sales transactions of system users. As will be appreciated, transactions constitute a substantial database that contains data about the sales transactions and operations of system users that is built by the ingestion, cleaning and aggregation of external applications (e.g., CRMs) with data produced within the ecosystem in which those external applications operate.

Activities, which contains activities from existing sales tools that do not fall under the Transaction data source and can include, for example, the history of the meetings (past and scheduled in the future) and email exchanges between sales customers and their buyers.

Connectors, which contains the list of connections within the network. When two users decide to be part of each other's personal network, including sharing information and allowing for mutual help recommendations, a so-called personal relationship is established. These relationships can be dismissed by any of the two parties. The associated requests for connection can be dismissed before being accepted. In some implementations, this database contains the actual (i) list of these relationships, (ii) the list of personal relationships that have been dismissed and finally (iii) the list of associated requests that have been sent out but not accepted nor dismissed yet. As will be appreciated, each of the three categories can provide insight into the relative strength (or lack thereof) of a connection between any two people.

Employment Info, which contains the information on where the people work.

Output data sources are data sources that are produced in the context of the disclosed systems. Output data sources can be further divided into either i) intermediate artifacts used to produce other output data sources or ii) data sources consumed directly within the recommendations and narrative algorithms.

Relationship (Knows) Database can constitute a database that contains the information on who knows who, and how well. The information in this database can be computed from the input data sources identified above with large scale processing methodologies on the cluster of machines described in relation to FIG. 1. As a broad and nonlimited overview, if two people know each other, then aspects of the disclosed technology track the relationship within this Relationship Database along with all the information on when these people started to know each other, and how well these two people know each other and for what reason they know each other (e.g., they have been part of the same selling team once or many times, they have been attending the same meetings, one has sold successfully to the other many times, etc.).

As will be understood by one of skill in the art, variations of this arrangement can be defined by the size of the database and its structure. For example, a Knowledge Tenant system that involves multiple, but independent, entities pooling data sets for aggregate application to solve individual user problems can be used. As used herein, the Knowledge Tenant or tenant can be any organization or entity employing the systems and methods described herein. The users of the systems and methods described herein can also be employed by the tenant. As the number of data sources grow, each with confidentiality obligations, access and utilization of the data to support system-derived ranked connections requires filtering and separate screening operations.

For example, according to certain embodiments, the disclosed system can combine user data with data from outside of a user's organization (through an invitation to friends and people, either within a user's organization or who are part of an existing knowledge network (e.g., those in a Relationship (Knows) Database) based on pre-set agreements to share similar sources of data and information), thereby leveraging the aggregated database to determine the strength of various relationships. As discussed, aspects of the disclosed system can graph the data to recommend certain connectors to a user, rank helpful contacts/connectors, provide reasons for why a particular connector would be useful, and output the information to a user interface in a manner that allows a user to quickly digest and understand the information graphed by the system.

As described herein, the presently disclosed systems can utilize artificial intelligence (AI) and machine learning (ML) techniques. As would be appreciated, such a system can constantly receive, update, and evolve based on new information. The system can constantly take in data. In such an example, the recommended connectors can simply be a single data point in time that can update and evolve based on new information. The system can additionally use AI and ML techniques to update the scoring system. While certain scoring formulas are described herein and certain parameters assigned certain weights, the disclosure is not intended to be so limited. Rather, the scoring formulas and weights given to certain parameters can also be updated and evolved by the AI and ML techniques as the system takes in new data.

Further, aspects of the disclosed technology can determine a frequency metric relating to contacts. For example, depending on the inquiry, the system can identify that a certain user (i.e., connector) "frequently communicates with" a certain prospective buyer or "rarely communicates with" a certain prospective buyer. Other methods for quantifying contact "frequency" can include a scale or numerical value. The disclosed technology can, for example, extract this information from email and calendar data for the connector. Other sources of connector data include Voice over Internet Protocol ("VoIP") for which Natural Language Processing ("NLP") can be used to better understand the context and intent of communications to further enrich the relationship graph.

As will be understood and appreciated, system pre-sorting and unification of contact data improves the accuracy of connectors because contact unification allows system discrimination of activities performed by the same person or by different people.

Figure 3:
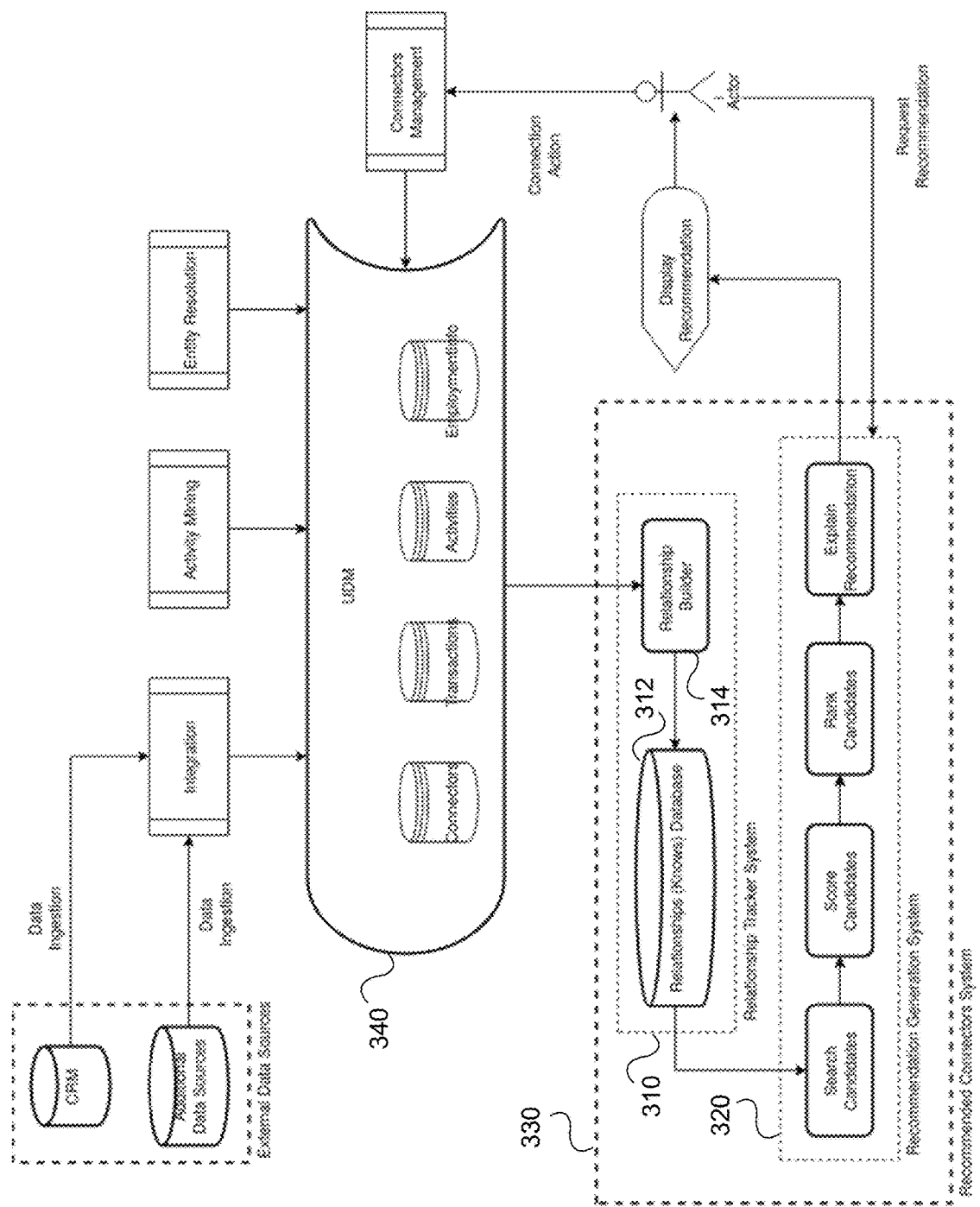
FIG. 3 is an example logic flow depicting the application workflow for implementing connection processes and scoring operations, according to embodiments of the disclosed technology.
Figure 4:
FIG. 4 is an example user interface presenting ranked and/or scored connectors, according to embodiments of the disclosed technology.
Figure 4:
Figure 4:
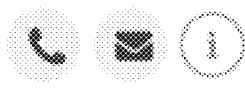
Figure 4:
Figure 4:
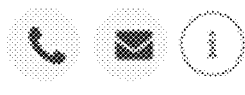
Figure 4:
Figure 4:
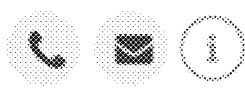
Figure 4:
Figure 4:
Figure 4:
Figure 4:
Figure 4:
Figure 4:
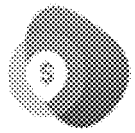

FIG. 3 is a workflow diagram that depicts the operational logic of the system according to some implementations. As shown, processing is both sequential and in parallel.

Recommendations share a part of the workflow and then they continue with a specific flow of processes until they provide the final information to the user. The common part is essentially the construction of the Relationship (Knows) Database (i.e., Relationship Building). As shown, recommendation types continue with a phase of Search of Candidates, followed by a Ranking Candidates process, a Produce Explanations process and finally a Render process where the system outputs the recommendation to the final user.

Relationship Tracker System 310

In example implementations, a Relationship Builder 314 as shown in FIG. 3 can aggregate the history of transactions to determine, for example, the quantity that a person has sold to another person or to an organization, or the opportunities that the person has lost with another person or with an organization. Other aspects of a business opportunity can be considered. The aspects can include a company associated with the business opportunity, personnel associated with the business opportunity, and competitors associated with the business opportunity. The relationship tracker system 310 can also track data related to the business opportunity. The data representative of the business opportunity can include at least one of information relating to a company, personnel, timing, cost, and competitors associated with the business opportunity. As will be understood, a Relationship Builder 314 analyzes data to understand the influence of each person into his employer. All the "knows" relationships that are discovered by the Relationship Builder 314 are materialized into a database such as the Relationships Database 312 shown in FIG. 3.

Recommendation Generation System

The manner in which the disclosed systems generate any recommendation can be broken down into four macro-steps as shown in FIG. 3: Search Candidates, Score Candidates, Rank Candidates, and Explain Recommendations, though such breakdown is intended to be nonlimiting and is provided for better understanding of the disclosed technology's functionality. As will be understood, each recommendation type follows an ad-hoc algorithm that takes into account different metrics and defines different scoring functions. A brief explanation of the steps for each recommendation type, including representative metrics and scoring functions, is presented below.

Although the components of the relationship tracker system 310 and the recommendation generation system 320 are illustrated and discussed as being a part of the recommended connectors system 330, it is to be understood that any and/or all of the components discussed above can be implemented using separate systems. In other words, the components of the relationship tracker system 310 and the recommendation generation system 320 need not be a part of the same system as the components can be connected and communicate with each other even in separate systems. The recommended connectors system 330 can also be connected to a backend processing component 340, which can perform some or all of the functionality described below. Alternatively, or additionally, some or all of the functionality described below can be performed by other components not shown.

The recommendation generation system 320 can also collect business intelligence data. The business intelligence data can help to shape the connections to the user and dynamically update the connections over time. The business intelligence data can include, for example, a phone number of the respective connection, email address of the respective connection, employer information relating to the respective connection, information representative of prior communications between the respective connection and the user, and a respective score of the respective connection. The information representative of prior communications can comprise at least one of email correspondence, phone calls, voice messages, appointment information, and short message service messages, multimedia messaging service messages. The appointment information can be extracted from an electronic calendar associated with the user.

For any of the examples described below, or any of the embodiments described herein, the terms "buyer" and "seller" can refer to any relationships established relevant to a business opportunity. For example, when a sale is being made between two entities, the relationships relevant to the business opportunity (the sale) can include employees of the entity making the sale (seller) and entities receiving the sale (buyer). In such examples, the buyer and the seller can be separate organizations or Knowledge Tenants. Also as used herein, the terms "person," "people," "user," and "users" are intended to be interchangeable and non-limiting.

Recommended Buyer Recommendation

Recommended Buyer Recommendations are in the context of an opportunity. For example, an opportunity has a selling team, formed by a set of people working on the deal who are employed by the tenant, and a buying team that is composed of the people who are following the deal at the buyer. The people on the buying team are either added manually by any person in the selling team or are auto-added depending on certain activities (e.g., if a person is requesting security clarification on the system, then the system can automatically add that person to the buying team).

In the context of a Recommended Buyer Recommendation, aspects of the disclosed technology can search for and identify the people who are working at the buyer and have not yet been added to the buying team (as represented by the illustrated Search Candidates stage). Similarly, in the context of a Recommended Buyer Recommendation, aspects of the disclosed system can store a set of employees of the buyer, which can be a large set, and rank which buyer employee better qualifies to be part of the buying team of the opportunity (as represented by the illustrated Search Candidates and Rank Candidates stages). Finally, along with scoring and ranking the candidates, aspects of the disclosed system can generate explanations of why a candidate is shown. These explanations can be formed with a further refinement of the initial metrics. As will be appreciated, the refinement can provide more human-consumable information on why the person is a good recommendation for buyer, seller, etc.

Recommended Connectors

A user's network can consist of a variety of people that includes those who are connected to the user by, for example, accepting an invitation to connect, or people who have worked together in a selling team or communicated over an opportunity. Also, aspects of the disclosed technology can automatically add people who have been colleagues in the past or present to a person's network. The connectors, or people in a user's network, also can be defined as existing relationships. A user can have relationships with each of their connections.

To grow a person's network, aspects of the disclosed technology can mine historical records of people from different companies who have worked together as sellers of an opportunity (i.e., a business opportunity) or those who have interacted over an opportunity, and then extract meaningful information about who is a good fit to help the person in future dealings. The system can then recommend such people to be part of a person's network and to be added to the user's relationships. The search can consider existing connections in the user's network and relationships as well as external candidates not yet connected to the user's relationships.

Various aspects of the disclosed technology can score and rank candidates by selecting candidates according to the importance and closeness to the person using a scoring function that looks at the pattern of communication of the candidates about a deal. The disclosed technology also can analyze the candidates' influence over a particular business opportunity. For example, the score can take into account whether or not a candidate is or is not decisionmaker.

Similar to other cases, the disclosed technology can generate explanations of the recommendations by processing the metrics and surfacing what signals are important for the user to understand the quality of the recommendation and make an informed decision as to whether or not to make a connection.

In additional implementations, the disclosed technology can determine recommended sellers in company-based recommendations. As will be appreciated, these recommendation aim at retrieving the best connectors in the network of the user that can help selling to a buyer company. These connectors can be either colleagues or any other person in the user's network. Such connectors also can have an existing relationship with the user, but also can be suggested from outside the user's network.

In an initial phase, the technology can search the people working at the buyer's company. Once these people are identified, the disclosed technology can seek to understand who in a user's existing network can help the user reach the identified buyers. Once the system identifies what can be a potentially large set of people in a user's network that know someone working for the buyer, the disclosed technology can determine the best people in the network for reaching the buyer. As will be appreciated, those candidates are likely those who have stronger relationships with the buyer's employees. The disclosed technology can measure the strength of these relationships by a scoring function that incorporates a variety of different metrics. These metrics take into consideration the number of buyer contacts that a person knows, how well he knows these buyers, the quantity of historical transactions (both lost and won) that a connector has done with the buyer contacts or with the buyer organization. Once identified, the disclosed technology can generate an explanation of why the connector might make for a good connection for the user's benefit.

Aspects of the disclosed technology also can make recommendations of recommended sellers that are opportunity based. As will be appreciated, these recommendations aim at retrieving the best employees in the system that can help sell to a buyer company (i.e., employees that be added to the selling team). These employees can be either colleagues or any other person in the user's company. The connectors can also be external connectors not yet included as part of the user's network or relationships.

In an initial stage, the disclosed technology can search the employees of tenants who have communicated with selling team members of the relevant business opportunity. Once the system identifies these people, the system can suggest them to the user as potential sellers to be added to selling team. Further, as shown above, the disclosed technology can rank all the possible candidates to be recommended. This ranking can be done by the implementation of some metrics that assess each of the candidates on different dimensions. In this way, the system can quantitatively measure relative strength of the various candidates. Finally, the system can return the rankings and candidates, along with an explanation and various other business intelligence, for display at a UI of the user.

As noted, aspects of the disclosed technology include scoring or ranking of each individual's usefulness to the larger network/their connectors. If a user is unhelpful to others over time, the disclosed technology can recognize the relative unhelpfulness and reduce their ranking as someone who (while they can help) chooses not to help others. For example, someone who does not accept invitations to connect or fails to respond to emails or calls might have their score reduced by the system. Further, the system can share this score with other system users and apply the reduced score in ranking the unhelpful connector. By evaluating information accessible to the system, the system can translate seemingly subjective characteristics such as usefulness into digitally readable data for computer processing.

Alternatively, when a connector is helpful, such as when the value of the revenue their help has created and the number of people and transactions the connector has helped over time, the system can recognize the helpfulness and display such helpfulness for other users, employers, and others to use in, for example, and increased score for the helpful user. Aspects of the disclosed systems also can combine such data with a potential employer's data for that employer to see a potential employee's overlap with that employer's prospects/buyers and more generally to elucidate the value of that potential employee's network to the employer.

Providing this relationship data in a large graph database allows system ranking of connections that assist in closing a transaction at a buyer/organization. In addition to using algorithms with data sourced from the graph database, aspects of the disclosed system can identify and assess possible exchanges between users by, for example, calculating a quid pro quo ratio for each user. The system can in turn use the calculated ratio to identify connectors that, for example, may be helpful because they have an influencing role or have purchased products at a company that the other user is seeking to engage in a selling transaction.

By combining this information along with a history of helpfulness, and other inputs forming the score, aspects of the disclosed system can identify one or more "optimal" connections from a user's organization and/or personal network in terms of ability and willingness to assist. In addition to ranking a person by multiple methods, aspects of the disclosed technology can abstract raw data to provide a user with context for why an identified person can be helpful. Examples may be "this user has worked in the past with", "can help with y and you can help them with x", or other rationales that will be evident to those of skill in the art.

As will be apparent in view of the discussion of the metrics and ranking system below, another novel aspect of the disclosed technology is its ability to identify different attributes from a graph and other data that allows the system to weigh attributes differently and to recommend different connections for different problems or situations. Over time, the disclosed system can learn, as reflected by the adjustment of algorithm parameters to assure that different combinations of factors surface different connections.

To illustrate with a nonlimiting example, when negotiating the price of a contract, the system may identify a user who has sold to a target company in the past as more valuable, thus resulting in the system calculating a higher score for that user. Alternatively, where a prospective client stops talking to a user/seller, the system may identify this change and score higher a user who has spoken recently to that prospective client or who has an upcoming meeting with that prospect. As will be appreciated, by applying machine learning, the disclosed technology can identify many different patterns that refine the recommendation system scoring and validate different attributes as enhancing valuation of the connection. These, along with information about how users can help each other, can be abstracted and displayed to the user by the disclosed system.

Metrics and Ranking System

As discussed above, aspects of the disclosed technology rank possible candidates to in turn make recommendations of those candidates. In some implementations, scoring is done by implementing one or more metrics that assess candidates on different dimensions. In this way, the disclosed technology can quantitatively measure the relative strength of a given candidate. As will be understood, in various implementations, the disclosed system will use a combination of certain metrics to compute a score of the candidate with a scoring function. As will be appreciated, the scoring function has the goal to balance out the various metrics and be fair among metrics that conflict with each other while at the same time weighing the metrics that are more relevant for the specific recommendation. Accordingly, it should be understood that each recommendation type uses a specific set of metrics and a specific scoring function relevant to that particular recommendation type.

An illustrative example of the foregoing applies the following nonlimiting connection ranking algorithm for assessing potential utility or importance of various users in situation where another user (e.g., salesperson) is attempting to make a sale to another user (e.g., a buyer):

In certain implementations, a scoring function according to the disclosed technology can be given as, for example, Score=$a*R+b*F+c*I+d*S$, where $a=2.5$, $b=1.5$, $c=d=1$, and where R represents recency in which a user has connected with the buyer, F represents frequency at which a user connects with the buyer, I represents a user's influence with respect to the buyer, and S represents relative strength of the user's relationship with the buyer. In other examples, $b=1.5*c$, $a=1.5*b$. In other examples, a can be greater than b which can be greater than c and d. The variables c and d can be equal but need not be. In some examples, c can be greater than or equal to d.

As will be understood, the coefficient values weight the various input metrics such that Recency is the most important factor, Frequency is the second-most important, and Influence and Strength are the final discriminators, at the same level of importance. As will be appreciated, when determining a user's relative importance in the potential sale and scoring such, the recency with which the user has had contact with the buyer can be considered the most important factor followed by the frequency with which the user and the buyer are in contact. The user's influence with the buyer and the strength of the user's relationship can be considered less important though still significant. It should be understood that the weighted values are exemplary and nonlimiting. In certain implementations, the weights can, for example, be proportionate to each other. After determining scores for candidates, the system can then sort the score values and generate a list of recommendations that the system can present to the user.

Aspects of the disclosed technology can provide various recommendations. The following examples are provided by way of illustration and not limitation. In an example implementation, the disclosed technology can provide Recommended Connectors and Recommended Sellers that are Opportunity Based. In such a scenario, the disclosed technology can leverage frequency of communication between the candidate and the user (F) along with recency of communication between the candidate and the user (R). In such a scenario, the scoring function can be, for example, Score=$a*R+b*F$, where $a=0.6$, $b=0.4$.

In an additional example implementation, the disclosed technology can provide Recommended Sellers that are Company Based. In such a scenario, the disclosed technology can leverage recency of the latest activity of the connector with any of the buyer contacts (R), and as a connector can be linked to many buyer contacts, each one having a last activity, the system can consider the latest (i.e., most recent) activity among those activities. They system can also leverage frequency of the activities of the connector with the buyer contacts (F). As will be appreciated, as a connector can be linked to many buyer contacts, the system can consider the average of the frequencies of activities with these buyer contacts. Additionally, the system can leverage seller influence (IS), which can be characterized as the influence of the connector into the selling company. Further, the system can leverage average buyers influence (IB), which can consider the average of the influence of all the buyers that are connected with the sellers into the buyer company. Further, the system can leverage average business strength (S), which can measure the strength of the business relationship between the connector and the buyers of the account. IN certain implementations, average business strength can be computed considering how many won and lost deals between the two people exist, with the won deals weighing more. Finally, the system can leverage won deals (W), which can be the number of the historical won deals of the connector with the company (irrespectively of the buyers) and lost deals (L), which can be the number of the historical lost deals of the connector with the company (irrespectively of the buyers). In such a scenario, a representative scoring function can be provided as, for example, Score=$a*R+b*F+c*IS+d*IB+e*SC+f*SA$, where $a=2$, $b=1.5$, $c=d=e=f=1$.

The implementations and embodiments disclosed and described above can be executed or performed with a combination of one, any, or all of the following computer components.

Figure 5:
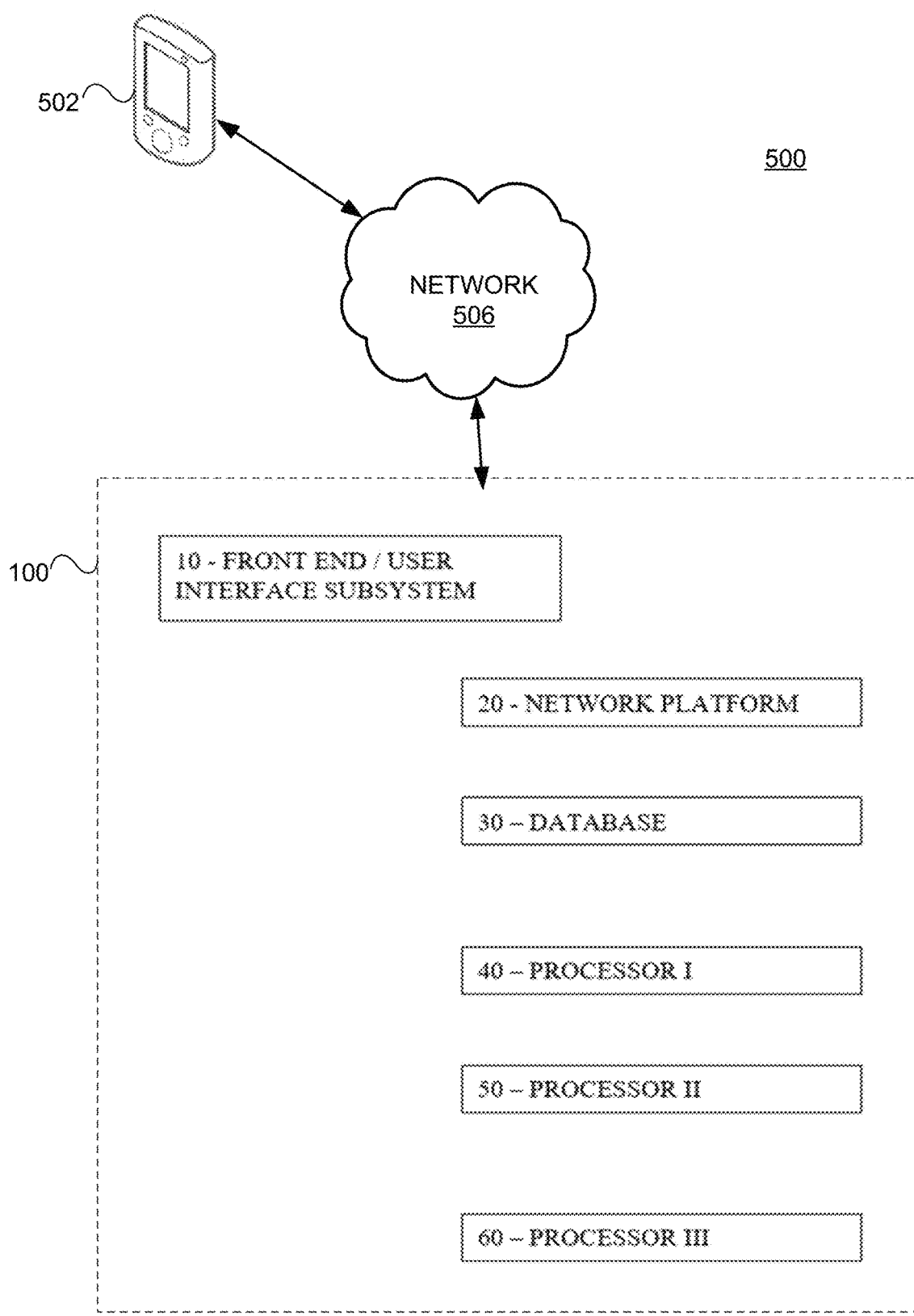
FIG. 5 is an example system environment used to implement examples of the present disclosure.

Tuning to FIG. 5, a diagram of an exemplary system environment 500 that may be configured to perform one or more processes disclosed herein is shown. The components and arrangements shown in FIG. 5 are not intended to limit the disclosed embodiments as the components used to implement the disclosed processes and features may vary. As shown, system environment 500 may include a hardware/software platform structure 100 for implementing aspects of the disclosed technology. Additionally, the system environment may include one or more computing device(s) 502, which can be configured to communicate with the hardware/software platform structure 100 over a network 506. An example architecture that may be used to implement one or more of the computing device 502 and/or hardware/software platform structure 100 is described below with reference to FIG. 6.

Computing device 502 can include one or more of a mobile device, smart phone, smart watch, smart glasses, other smart wearable device, general purpose computer, tablet computer, laptop computer, telephone, PSTN landline, voice command device, other mobile computing device, or any other device capable of communicating with network 506 and ultimately communicating with one or more components of hardware/software platform structure 100. According to some example embodiments, computing device 502 may communicate with any components of the system environment 500 via a direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. In some embodiments, computing device 502 may include or incorporate electronic communication devices for hearing or vision impaired users. In some embodiments, one or more computing devices 502 may include software that is configured to allow a user to verify a purchase and/or authenticate a user of computing device 502.

Network 506 may be of any suitable type, including individual connections via the internet such as cellular or Wi-Fi networks. In some embodiments, network 506 may connect terminals, services, and mobile devices using wired or wireless communication which include direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 506 may comprise any type of computer networking arrangement used to exchange data. For example, network 506 may be the Internet, a private data network, virtual private network using a public network, and/or other suitable connection(s) that enables components in system environment 500 to send and receive information between the components of system 500. Network 506 may also include a public switched telephone network ("PSTN") and/or a wireless network.

Hardware/software platform structure 100 may be associated with an entity such as a business, corporation, individual, partnership, employer, or any other entity that provides one or more of goods, services, and consultations to individuals such as customers, or with an entity that provides services, such as software services, to a business, corporation, individual, partnership, employer, or any other entity. For example, hardware/software platform structure 100 can be the Knowledge Tenant or the tenant or any group working collectively on a business opportunity, or can be made available for use by the Knowledge Tenant or the tenant or any group working collectively on a business opportunity.

Though not necessarily shown, hardware/software platform structure 100 may include or be configured to communicate with one or more servers, devices, and computer systems for performing one or more functions associated with technology disclosed herein. Such servers, devices, and computer systems may include, for example, web servers, location services servers, transaction servers, and databases, as well as any other computer systems necessary to accomplish tasks associated with the disclosed systems and methods.

Web servers may include a computer system configured to generate and provide one or more websites accessible to customers, as well as any other individuals involved in an organization that makes use of the disclosed technology. Web servers may include a computer system configured to receive communications from computing device 502 via for example, a mobile application, a chat program, an instant messaging program, a voice-to-text program, an SMS message, email, or any other type or format of written or electronic communication. Web servers may have one or more processors and one or more web server databases, which may be any suitable repository of website data. Information stored in web servers may be accessed (e.g., retrieved, updated, and added to) via network 506 or a local network by one or more devices of system 500. According to some embodiments, web servers may host websites, data or software applications that computing device 502 may access and interact with. For example, web servers may provide a website, web portal or software application that allows a user of computing device 502 to access or view account information associated with the disclosed technology including, for example, user interfaces generated by the disclosed systems and methods.

According to some embodiments, databases for use by the disclosed technology may be databases associated with example hardware/software platform structure 100 and/or those who provide and/or use aspects of the disclosed technology. Databases may store a variety of information relating to customers, transactions, customer information, and business operations. Databases may also serve as a back-up storage device and may contain data and information that is also stored on, for example, local databases associated with the web servers, location services servers, transaction servers, and/or other components. Databases may be accessed by other devices and may be used to store records of every interaction, communication, and/or transaction a particular customer has had with a particular organization or individual. In some example implementations, such databases may store data associated with current or past transactions conducted by users of disclosed technology, such as data identifying a purchaser, purchased product names, product descriptions, timestamp, location data, online URLs of items purchased, return policy expiration date, taxes, tip amounts, store name, cashier name and receipt preferences associated with past transactions, deal values, individuals involved with a particular deal, and the like.

Figure 6:
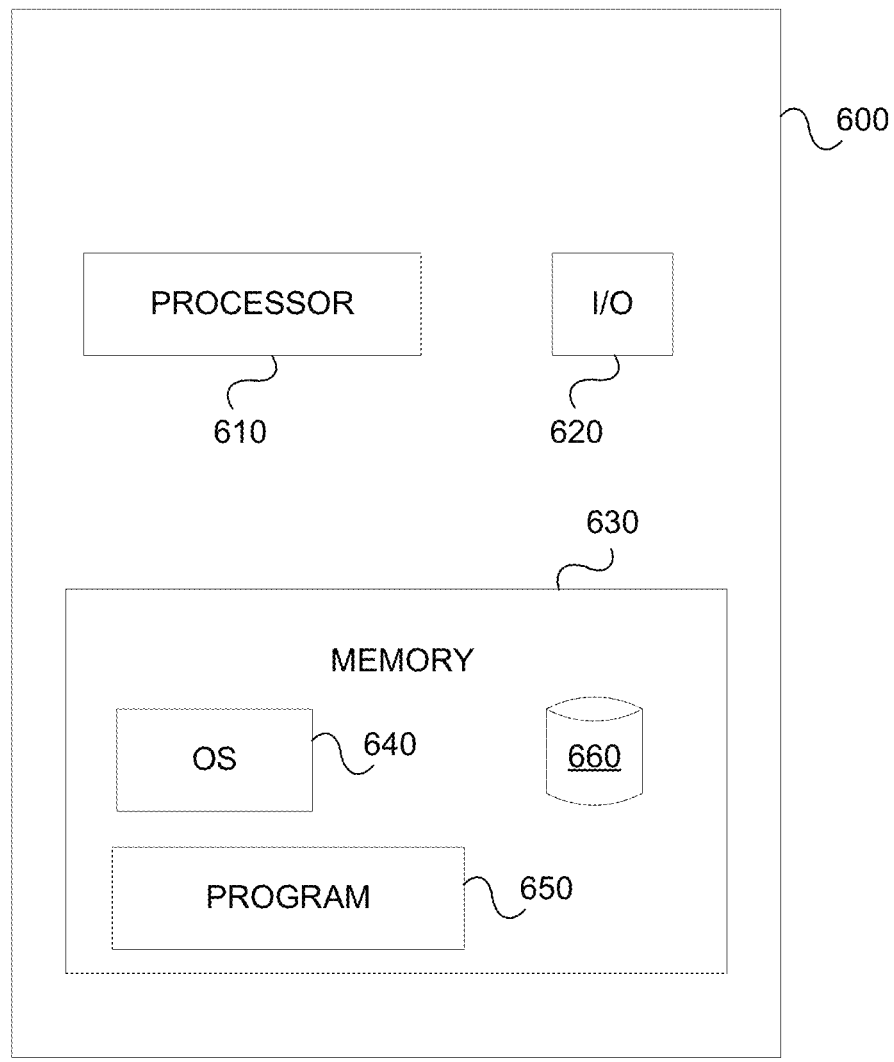
FIG. 6 is an example computing device illustrating hardware used to implement examples of the present disclosure.

FIG. 6 represents an example architecture 600 that can be used to implement some or all of computing device 502 and/or example hardware/software platform structure 100. As shown, example computing architecture 600 may include a processor 610, an input/output ("I/O") device 620, a memory 630 containing an operating system ("OS") 640 (such as any version of CentOS), a program 650, and a database 660. For example, example computing architecture 600 may be a single server or may be configured as a distributed computer system including multiple servers or computers that interoperate to perform one or more of the processes and functionalities associated with the disclosed embodiments. In some embodiments, example computing architecture 600 may further include a peripheral interface, a transceiver, a mobile network interface in communication with processor 610, a bus configured to facilitate communication between the various components of the example computing architecture 600, and a power source configured to power one or more components of example computing architecture 600.

The processor 610 may include one or more of a microprocessor, microcontroller, digital signal processor, co-processor or the like or combinations thereof capable of executing stored instructions and operating upon stored data. Memory 630 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. For example, memory 630 can include from 62 GB to 378 GB of RAM. In another example, the database 660 can include one or more hard disks varying from 95 GB to 128 GB. In one embodiment, the processing techniques described herein are implemented as a combination of executable instructions and data within the memory 630.

Processor 610 may be one or more known processing devices, such as a microprocessor from the Pentium™ family manufactured by Intel™ or the Turion™ family manufactured by AMD™. Processor 610 may constitute a single core or multiple core processor that executes parallel processes simultaneously. For example, processor 610 may be a single core processor that is configured with virtual processing technologies. In certain embodiments, processor 610 may use logical processors to simultaneously execute and control multiple processes. Processor 610 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a USB port (e.g., standard, mini, micro, full duplex/Type C, etc.), a high definition multimedia (HIDMI) port, a video port, an audio port, a Bluetooth™ port, a near-field communication (NFC) port, another like communication interface, or any combination thereof. In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 610 to communicate with other devices via wired or wireless networks, whether local or wide area, private or public, as known in the art. A power source may be configured to provide an appropriate alternating current (AC) or direct current (DC) to power components.

Figure 7:
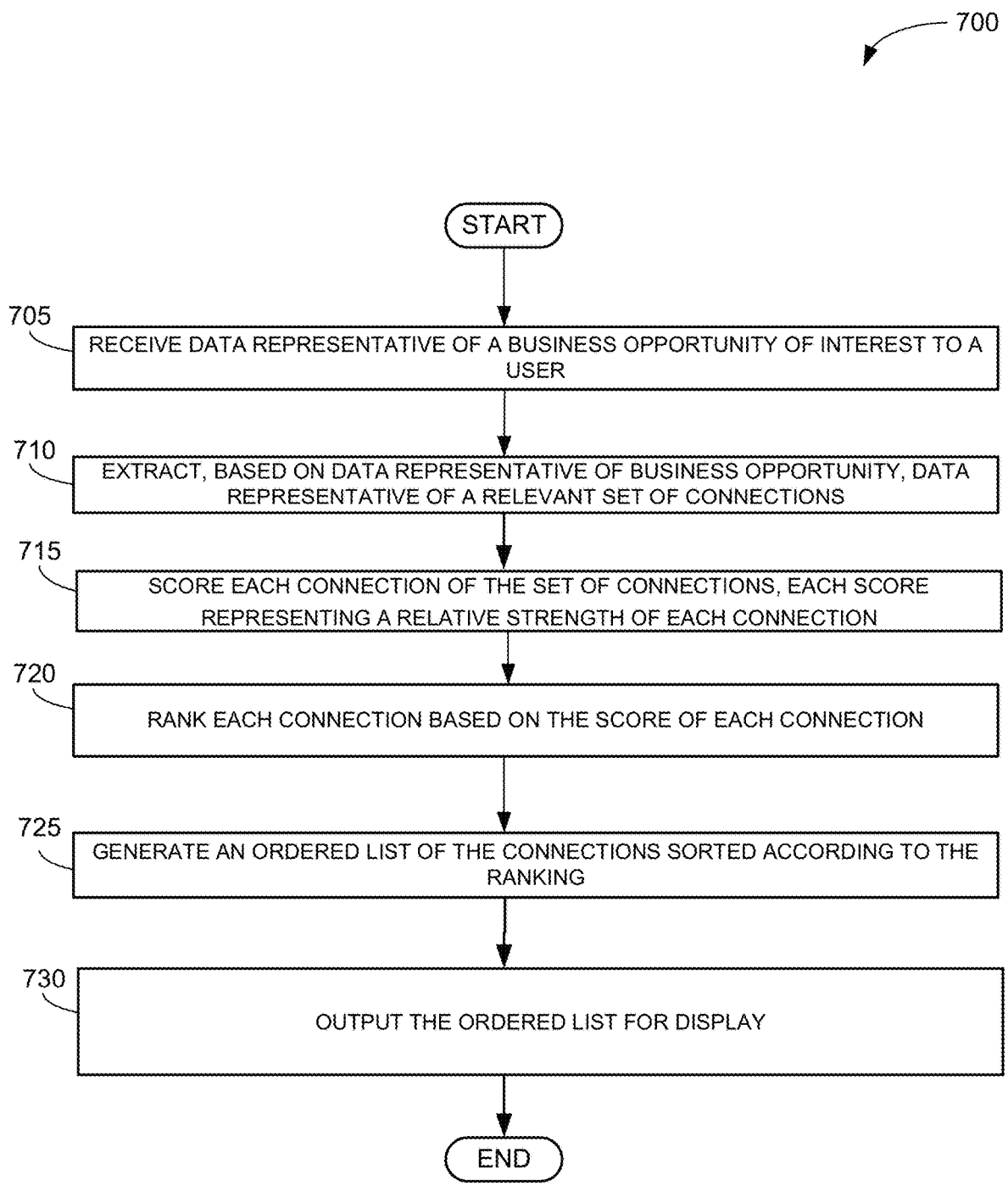
FIG. 7 is a flowchart of an exemplary method according to some examples of the present disclosure.

FIG. 7 is an example flow chart of an exemplary method 700 according to the disclosed system and methods. As shown in FIG. 7, method 700 can include receiving 705 data representative of a business opportunity that is of interest to a user. As further shown, method 700 can include extracting 710 data that is representative of a relevant set of connections based on information related to the business opportunity. In some embodiments, this set of connections can likewise be related to the user who has interest in the business opportunity. As further shown in FIG. 7, method 700 can include scoring 715 each connection in the set of connections such that the score represents a relative strength of a connection to the business opportunity and, in some cases, the user. After scoring the connections, method 700 also can include ranking 720 the connections based on their respective scores and then generating 725 an ordered list of the connections according to the rankings. Finally, method 700 can include outputting 730 the ordered list of connections for display at a user interface associated with the user.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a cloud computing network of remote servers, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to computing devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for quantifying relative strength of one or more relationships to a business opportunity, the method comprising:

receiving, at a computing device, data representative of a business opportunity;

extracting, by the computing device and from a database, based on the data representative of the business opportunity, data representative of a set of relationships relevant to the business opportunity and a user;

scoring, by the computing device, each relationship of the set of relationships relevant to the business opportunity, each score representing a relative strength of each respective relationship to the business opportunity and the user;

ranking, by the computing device, each relationship of the set of relationships based on respective scores of each relationship;
identifying, by an algorithm sourced from a graph database, one or more optimal relationships from the set of relationship;
determining an associated helpfulness for the one or more optimal relationships;
generating, by the computing device, a list of relationships;
automatically adding the one or more optimal relationships to a network associated with the user; and
outputting, for display at a user interface of the user, an ordered list of relationships and the one or more optimal relationships.

2. The method of claim 1, wherein the scoring is based at least in part on a frequency and a recency with which a particular relationship has had interactions with an aspect of the business opportunity and the user.

3. The method of claim 1, wherein identifying one or more optimal relationships from the set of relationship further comprises at least one of (i) identifying relationships in an influencing role or (ii) identifying relationships with recorded purchases from a company associated with the business opportunity.

4. The method of claim 1, further comprising determining, based on the associated helpfulness, a context for the associated helpfulness.

5. The method of claim 4, wherein outputting, for display at a user interface of the user, the ordered list of relationships and the one or more optimal relationships further comprises outputting a context for the associated helpfulness.

6. The method of claim 1, where the list is sorted according to the ranking of each relationship of the set of relationships.

7. The method of claim 1, wherein data representative of the business opportunity comprises at least one of information relating to a company, personnel, timing, cost, and competitors associated with the business opportunity.

8. The method of claim 6, wherein information relating to personnel associated with the business opportunity comprises at least one of decision maker and non-decision maker.

9. The method of claim 1, wherein a higher score is representative of a higher relative strength of a particular relationship to the business opportunity and the user.

10. The method of claim 1, wherein each relationship in the ordered list of relationships includes business intelligence data associated with each respective relationship.

11. The method of claim 10, wherein business intelligence data comprises at least one of phone number of the respective relationship, email address of the respective relationship, employer information relating to the respective relationship, information representative of prior communications between the respective relationship and the user, and a respective score of the respective relationship.

12. The method of claim 11, wherein information representative of prior communications comprises at least one of email correspondence, phone calls, voice messages, appointment information, and short message service messages, multimedia messaging service messages.

13. The method of claim 12, wherein appointment information is extracted from an electronic calendar associated with the user.

14. The method of claim 2, wherein an aspect of the business opportunity comprises at least one of a company associated with the business opportunity, personnel associated with the business opportunity, and competitors associated with the business opportunity.

15. A method for quantifying relative strength of one or more relationships to a business opportunity, the method comprising:
receiving, at a computing device, data representative of a business opportunity of interest to a user;
extracting, by the computing device and from a database, based on the data representative of the business opportunity, data representative of a set of relationships relevant to the business opportunity;
scoring, by the computing device, each relationship of the set of relationships relevant to the business opportunity, each score representing a relative strength of each respective relationship to the business opportunity;
ranking, by the computing device, each relationship of the set of relationships based on respective scores of each relationship;
identifying one or more optimal relationships from the set of relationships that is in an influencing role using an algorithm sourced from a graph database;
determining an associated helpfulness for the one or more optimal relationships, the associated helpfulness comprising data generated by the one or more optimal relationships;
generating, by the computing device, a list of relationships;
automatically adding the one or more optimal relationships to a buying team associated with the business opportunity of interest; and
outputting at least one of the list of relationships and the one or more optimal relationships.

16. The method of claim 15, wherein the scoring is based at least in part on a frequency and a recency with which a particular relationship has had interactions with an aspect of the business opportunity.

17. The method of claim 15, wherein the data generated by the one or more optimal relationships comprises revenue data and quid pro quo data.

18. The method of claim 15, wherein a higher score is representative of a higher relative strength of a particular relationship to the business opportunity and the user.

19. A method for quantifying relative strength of one or more relationships to a business opportunity, the method comprising:
receiving, at a computing device, data representative of a business opportunity of interest to a user, the user associated with an organization;
extracting, by the computing device and from a database, based on the data representative of the business opportunity, data representative of a set of relationships relevant to the business opportunity and associated with the organization;
scoring, by the computing device, each relationship of the set of relationships relevant to the business opportunity, each score representing a relative strength of each respective relationship to the business opportunity;
ranking, by the computing device, each relationship of the set of relationships based on respective scores of each relationship;
identifying one or more optimal relationships from the set of relationships using an algorithm sourced from a graph database;
determining an associated helpfulness for the one or more optimal relationships, the associated helpfulness comprising data generated by the one or more optimal relationships;

determining, based on the associated helpfulness, a context for the associated helpfulness;

providing the associated helpfulness and context to the graph database, the graph database configured to provide algorithms based on the graph database;

generating, by the computing device, a list of relationships, the list sorted according to the ranking of each relationship of the set of relationships;

automatically adding the one or more optimal relationships to a buying team associated with the business opportunity of interest;

automatically adding the one or more optimal relationships to a network associated with the user; and outputting, for display at a user interface of the user, the list of relationships, the one or more optimal relationships, and the context for the associated helpfulness.

20. The method of claim 19, wherein the scoring is based at least in part on a frequency and a recency with which a particular relationship has had interactions with an aspect of the business opportunity.

* * * * *